United States Patent Office 3,560,605
Patented Feb. 2, 1971

3,560,605
POLYETHYLENE TEREPHTHALATE INJECTION MOLDING COMPOSITIONS CONTAINING A POLYEPOXIDE
Erhard Siggel, Seckmauern, Walter Rein, Obernburg, and Hans-Martin Koepp, Erlenbach, Germany, assignors to Glanzstoff AG, Wuppertal, Germany
No Drawing. Filed Oct. 6, 1967, Ser. No. 673,308
Claims priority, application Germany, Oct. 8, 1966, G 48,116; Mar. 3, 1967, G 49,477
Int. Cl. B29f 1/00; C08g 45/04, 45/14
U.S. Cl. 264—328                    19 Claims

ABSTRACT OF THE DISCLOSURE

A polyethylene terephthalate injection molding composition in which there is melt blended and homogeneously distributed a minor amount of the di- or polyepoxide of a dihydric phenol as a modifying agent. The composition, particularly after being subjected to a heat treatment in the regranulated state, is useful for injection molding into articles which are dimensionally stable and resistant to impact. Process steps include admixing, melt blending and regranulating the initial components and further include a subsequent heat treatment of the regranulated product and/or its injection molding into suitable articles.

---

In general, this invention is concerned with the modification of polyethylene terephthalate by means of certain diglycidyl ethers as obtained by the epoxidation of dihydric phenols so as to achieve highly improved injection molding compositions and products, the final injection molded products being distinguished by their stability against dimensional changes, e.g. their shrink-resistance, and also their impact resistance.

It is known that injection molded articles can be produced from polyethylene terephthalate as a thermoplastic linear polyester which is relatively easily moldable by extrusion in conventional injection molding equipment. Polyethylene terephthalate is very resistant to chemical attack and has some outstanding mechanical properties. For these reasons, this polyester would normally be considered quite suitable for the production of injection molded articles. However, in spite of its many favorable properties, polyethylene terephthalate has not as yet been employed as a commercial injection molding material and its market for this purpose is extremely limited. In particular, it has been proven that injection molded articles consisting solely of polyethylene terephthalate are not dimensionally stable, especially at temperatures above the so-called second order transition point.

For the purpose of improving the dimensional stability of injection molded polyester articles, it has been suggested in copending application, Ser. No. 296,380, filed July 19, 1963, now Patent No. 3,361,848, that one should employ a polyester which contains up to 10% by weight of a poly-α-monoolefin, especially a high molecular weight polypropylene or poly-4-methylphentene-1, introduced in finely divided form. By means of this addition, the modified polyester can be injection molded into articles which exhibit an improved dimensional stability. However, this stability still is not entirely satisfactory. Thus, after subjecting such injection molded polyester articles to a heat treatment at elevated temperatures, they exhibit a pressure adjustment, i.e. they become distorted, if they are supported during this treatment in such a manner that the dead weight of the injection molded article cannot be optimally distributed.

One object of the present invention is to provide injection molding compositions or materials such as a regranulated polymer consisting predominately of polyethylene terephthalate but modified by admixture with one or more aromatic diglycidyl ethers as a distinct means of achieving a dimensionally stable and impact resistant injection molded article.

Another object of the invention is to provide processes by which polyethylene terephthalate can be treated to improve its capacity for injection molding and to permit controlled variations in its injection molding properties Still another object of the invention is to provide compositions, products and methods whereby a polyethylene terephthalate injection molding material can be pretreated in the form of a regranulate and then used directly or at a later point of time in the production of dimensionally stable and impact resistant injection molded articles.

These and other objects and advantages of the invention will become more apparent upon consideration of the following detailed specification.

It has now been found, in accordance with the present invention, that one can avoid the above noted disadvantages and obtain injection molded articles of polyethylene terephthalate which possess an outstanding dimensional stability and a good impact resistance if there is employed an injection molding substance wherein there is melt blended and homogeneously distributed in the polyethylene terephthalate from about 0.3 to 30% by weight, preferably about 0.5 to 10% by weight, of at least one diglycidyl ether of the formula

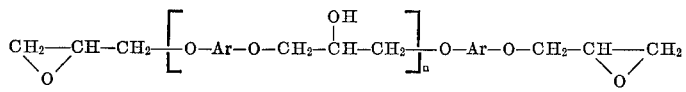

wherein Ar is a divalent radical representing the residue of an epoxidized dihydric phenol and $n$ is equal to or greater than 0. Especially favorable results are achieved, even when using the diglycidyl ether component in relatively small amounts, e.g. about 1 to 5% by weight, if the polyethylene terephthalate is admixed therewith and the mixture is melt blended and regranulated, and the regranulated product is then subjected to a heat treatment at 150° C. to 250° C., preferably 180° C. to 230° C. This regranulated and preferably heat-treated product can subsequently be used at any point of time for injection molding into articles of predetermined configuration, and the viscosity or melt index values of the granulated material can be varied within desirable limits suitable for injection or extrusion in conventional injection molding equipment.

The polyethylene terephthalate employed as the initial material, i.e. as the major component of the injection molding composition, is obtained by conventional polycondensation processes which are quite well known in this art. Various modified forms of polyethylene terephthalate are also suitable, e.g. where a portion of the ethylene glycol of the polyester is replaced by other aliphatic or cycloaliphatic glycols, such modifications having essentially the same properties as pure polyethylene terephthalate with respect to injection molding. The polyester may contain other substances such as catalysts which remain after its production, depending upon the particular mode of polycondensation. Moreover, the usual additives can be present, such as stabilizing agents against the effects of heat or light, antioxidants, dyes, pigments, inert fillers and the like.

This initial polyethylene terephthalate should normally have a relative viscosity of about 1.45 to 2.2 preferably about 1.7 to 2.1. All values of relative viscosity, sometimes referred to as the solution viscosity, are to be measured for purposes of the present invention as a 1% solution of the polymer in meta-cresol at 25° C.

The diglycidyl ethers of the Formula I are readily obtainable as commercial products, sometimes identified as di- or poly-epoxides of dihydric phenols but also referred to as glycidyl polyethers of dihydric phenols. They are obtained in a conventional manner, e.g. by condensation of epichlorhydrin with one or more dihydric phenols. When using more than 2 mols of epichlorhydrin for each mol of dihydric phenol, one obtains a pure distillable lower molecular weight product in which $n=0$. As the amount of epichlorhydrin is reduced, one obtains increasingly higher molecular weight compounds which for the most part are in the form of polymers or polyepoxides where $n>0$. A medium or average molecular weight is usually specified for commercially available products so that the value $n$ can be determined by a simple calculation. Since these commercial products are often mixtures or may also have partially reacted epoxy groups, the value of $n$ may be a fraction of a whole number. Depending upon the degree of condensation and the particular initial materials, these epoxides of dihydric phenols are fluid, semisolid or solid substances. Thus, it is possible to use both the lower molecular weight condensation products where $n=0$ as well as higher molecular weight products. In general, the value of $n$ in Formula I will range from 0 up to as high as about 30, although the desired results are best achieved with values of $n$ equal to about 5 to 20, preferably 10 to 15.

The dihydric phenols may be mono- or poly-nuclear phenols, preferably having one or two benzene nuclei, which can be connected directly together or joined by a hetero-atom such as oxygen or by an aliphatic bridge or intermediate linkage. The phenyl or benzene rings, in addition to the essential hydroxy substituents ordinarily located in para-positions, may also be further substituted with non-reactive or inert substituents, e.g. with halogen such as chlorine or bromine. These minor variations of the dihydric phenols are generally well known and one can readily select any of these materials for use within the scope of this invention. Suitable dihydric phenols include the following: 2,2-bis-(4'-hydroxyphenyl)-propane; 2,2-bis-(4'-hydroxyphenyl)-butane; 4,4' - dihydroxybenzophenone; bis-(4-hydroxyphenyl)-ethane; 1,4-dihydroxybenzene; and 1,5-dihydroxynaphthalene. Other suitable compounds include Bisphenol F

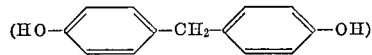

and Tetrachlorobisphenol A.

In the present invention, it is especially desirable to use the individual diglycidyl ethers or their mixtures which have the following formulae:

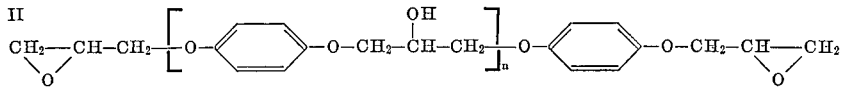

and

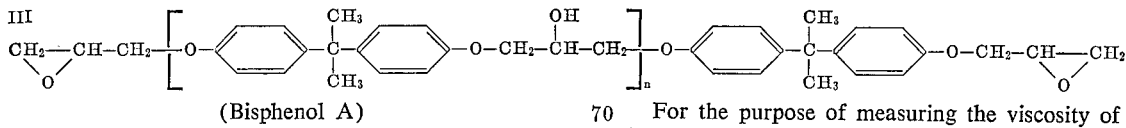

(Bisphenol A)

particularly where $n$ has a value of approximately 10 to 15.

The diglycidyl ether should be admixed with the polyethylene terephthalate in such a manner as to ensure a very homogeneous mixture of the two substances. For example, it is preferable to employ the initial polyethylene terephthalate in the form of very fine particles, mixing them as intimately as possible with the diglycidyl ether, and then melting the resulting mixture for additional blending under pressure, e.g. in an extruder. The resulting melt blended homogeneous mixture can be immediately processed into injection molded articles. It is preferable, however, to process the melt into a granulate by extruding into conventional strands or rods which are cooled in water, cut and subsequently dried. This latter procedure is commonly referred to as regranulation. The high shearing forces in the extruder cause a very thorough mixing of the molten mixture, and the resulting granulate is cut to a uniform particle size suitable for injection molding.

The regranulated injection molding composition produced in this manner is itself useful for the production of dimensionally stable injection molded articles. Surprisingly, however, a still further improvement is achieved if this regranulate is first subjected to a heat treatment without being melted at a temperature of at least 150° C. and preferably above 180° C., for example up to about 230° C. The regranulated material should be thoroughly heated or maintained at the specified elevated temperature for an extended period of time which depends upon the height of the temperature and the desired properties of the product resulting from this after-treatment. In practice, a period of approximately 5 to 20 hours is usually sufficient. With a regranulated injection molding material having a specific composition, the time required decreases with higher treatment temperatures, and for practical reasons, it is therefore desirable to use a higher treatment temperature to shorten the total heating time. Uniform heating of the regranulated material can best be accomplished in an enclosed heating zone, e.g. a tumbler dryer or similarly heated apparatus, so that there is no tendency for the granulate to become locally overheated or to form agglomerate masses which might result from a partial melting. Also, it is preferable to carry out the heating step under an inert atmosphere, e.g. nitrogen, and under reduced pressure by creating a vacuum in the heating zone. However, it is also possible to work under atmospheric pressure.

The most desirable temperature and treatment time for this intermediate heating of the regranulated injection molding material having any specific composition can be readily determined by simple testing of a small sample during the course of the treament. For the purpose of processing the regranulated material in an injection molding machine, it is desirable to achieve a heat-treated product having a melt viscosity or melt index value falling within certain limits, depending to some extent upon the capacity of the molding machine itself and suitable injection holding temperatures which together with the retention time of the molding material must be adjusted to avoid thermal damage to the polymer. It is a particular advantage of this invention that the modified polyethylene terephthalate molding composition can be made up so as to carefully control its melt viscosity within wide limits, especially when heat-treating the regranulated product.

For the purpose of measuring the viscosity of the injection molding composition, a melt index value is specified hereinafter as determined with a "Göttfert" melt viscosimeter. In each measurement, the cylinder of the viscosimeter was maintained at a temperature of 290° C., the weight of the piston amounted to 4.32 kg., and the exit nozzle had a diameter of 2 mm. In order to make the measurement, the polymer is heated up in the cylinder for 2 minutes, the melt is then permitted to flow out, and after 4 minutes there is measured the amount of melt which flows out over a time intervals of one minute. This measurement is then the so-called melt-index value which of course decreases with increasing viscosity.

In most cases, the injection molding compositions or regranulated materials of the invention should have a melt index value of at least 0.05 g./min. and generally no higher than 5.0 g./min. Especially good results are achieved by using a regranulated injection molding material which has been heat treated for a period of time sufficient to yield a melt index value of about 0.9 to 1.2 grams/minute.

Generally, the injection molding compositions or regranulated materials of the invention should have a melt viscosity between 4,000 and 400,000 poises at 290° C. with a preferred range from 10,000 to 50,000 poises.

In addition to the diglycidyl ether component of the polyethylene terephthalate injection molding materials of the present invention, other polymers can also be added in minor amounts, usually not more tha 20% by weight and preferably less than 10% by weight, with reference to the polyethylene terephthalate. In particular, especially favorable results have been achieved by similar melt blending and homogeneously distributing at least one poly-α-monoolefin of a 3 to 6 carbon atom monoolefin such as polypropylene or poly-4-methyl-pentene-1 in an amount of about 0.5 to 20% by weight, preferably between about 1 and 10% by weight. In a specific embodiment of the invention, it has been established that excellent results are also achieved by the addition of 0.5–20% by weight, especially about 1–10% by weight, of a high pressure polyethylene, preferably having a density of about 0.915 to 0.930. Injection molded articles produced from the polyester molding compositions containing such polyolefins in addition to the essential diglycidyl ether are particularly distinguished by their high impact resistance.

The invention is further illustrated by but not restricted to the following examples.

EXAMPLE 1

9.8 kg. of a dry, granulated polyethylene terephthalate having a relative viscosity of 1.77 and 200 g. of a dry, finely divided, commercially available diglycidyl ether (Epikote 1007), which is an epoxidized 2,2-bis-(4-hydroxyphenyl)-propane commonly identified as epoxidized Bisphenol A and which has an average molecular weight of 2900, were intimately mixed with each other and then melt blended in a double screw extruder for extrusion at 270–290° C. into individual strands. The extruded strands were cooled in water and cut into granules. By mild heating at 130° C. under a vacuum and an inert nitrogen atmosphere, the water content of the granulate was reduced to less than 0.01%.

This granulate was then processed in a conventional injection molding machine to produce dimensionally stable and impact resistant molded articles, e.g. cups, plates, bowls, combs, boxes and the like. The granulate was also injection molded into standard test bars having the dimensions 4 x 6 x 50 mm. Tests conducted with these bars showed an impact resistance of 197 cm. kg./cm.², according to DIN-Specification 53453 (German Industrial Standards). The molded material had a Martens temperature of 59° C. The same size test bars consisting of polyethylene terephthalate without the diglycidyl ether additive had a Martens temperature of only 50° C.

EXAMPLE 2

Following the same procedure as in Example 1, a granulate was produced from a melt blend of 9 kg. polyethylene terephthalate and 1 kg. of the same diglycidyl ether used in Example 1. This granulate was directly processed by injection molding into dimensionally stable and impact resistant articles. A shoulder rod having a length of 165 mm. and obtained by injection molding of the granulate was heated for an hour at 140° C. After this heat treatment, the length of the rod was 164 mm., the shrinkage therefore amounting to only 0.6%.

EXAMPLE 3

9.4 kg. of dry polyethylene terephthalate cuttings of a relative viscosity of 1.78 were admixed with 500 g. of a high pressure polyethylene granulate having a density of 0.918 and with 100 g. of the same diglycidyl ether as used in Example 1. This mixture was then melt blended and regranulated as in the preceding examples to form the desired homogeneous injection molding material. Test bars were injection molded from this material, and they exhibited and impact resistance of 210 cm. kg./cm.² and a Martens temperature of 58.5° C. Samples which had been heated for one hour at 140° C. still retained an impact resistance of 193 cm. kg./cm.².

EXAMPLE 4

By replacing the polyethylene component in either of Examples 2 or 3 with an equivalent amount of polypropylene or poly-4-methylpentene-1, injection molded articles were obtained and exhibited good dimensional stability as well as high impact resistance. The impact resistance was above 200 kg. cm./cm.², the Martens temperature was 60° C.

EXAMPLE 5

49.5 kg. of a polyethylene terephthalate granulate having a relative viscosity of 1.63 were mixed with 500 g. of the diglycidyl ether of epoxidized Bisphenol A, a polymeric material having an average molecular weight of 2,000. The mixture was melt blended in a double screw extruder at a cylinder temperature of 270–300° C. and extruded through a die plate into rods or strands of 3 mm. diameter. The extruded strands were led directly into a water-cooled bath for solidification and granulated with conventional cutting apparatus into granules of 3 mm. in length.

While still moist from the cooling water, this granulate was introduced into a tumbler dryer indirectly heated by means of diphenyl as the heat exchange fluid to a temperature of 130° C. The tumbler was enclosed to permit a drying of the granulate under a vacuum (pressure=2 mm. Hg) while leading nitrogen therethrough. After about 2 hours, the granulate had also acquired a temperature of 130° C. and any remaining water had been substantially removed. This temperature of 130° C. was maintained for still another hour, and the temperature of the tumbler dryer was then raised to 230° C. After five hours at this higher temperature, a sample of the granulate was removed and the melt index value was determined as falling within the range of 0.9 to 1.2 g./min.

After reaching this desired melt index value (as determined by the viscosimeter measurement described hereinabove), the vacuum and nitrogen input were discontinued. The resulting heat-treated granulate was then processed in the injection molding machine at cylinder temperatures of 260–300° C., preferably employing sprues or dies which are strong and resistant. Various injection molded articles could be made in this manner, including standard size bars for subsequent testing. All exhibited highly improved dimensional stability and excellent impact resistance.

EXAMPLE 6

47.0 kg. of polyethylene terephthalate of a relative viscosity of 1.60, 2.5 kg. of a high pressure polyethylene density=0.918 g./cm.²) and 0.5 kg. of the same diglycidyl ether employed in Example 5 were regranulated from the molten mixture and heat treated at 230° C. as in Example 5. In order to achieve a melt index value of 0.9–1.2 g./min., it was necessary in this case to maintain the heating temperature of 230° C. for a period of 8 hours instead of 5 hours. Again, similar valuable injection molded articles were obtained.

EXAMPLE 7

A mixture of 47.75 kg. polyethylene terephthalate, 1.00 kg. of the same diglycidyl ether used in Examples 5 and 6, and also 1.25 kg. of the same high pressure polyethylene used in Example 6 were processed into the regranulated product as in Example 5 and subjected to the same heat treatment for about 5 hours at 230° C. The granulate then exhibited a melt index value of about 1 g./min. When injection molded, this heat-treated granulate also gave excellent dimensional stability and high impact resistance.

The following table provides a comparison as between various injection molded standard test bars of polyethylene terephthalate modified in accordance with the compositions and methods of the invention. The injection molding materials in the form of the regranulated product differed in each case only as to the heat-treatment of the regranulated mixture or as to the amount of the diglycidyl ether additive. The polyethylene and diglycidyl ether are the same substances used in Examples 5–7. Percentages are by weight with reference to the polyethylene terephthalate.

TABLE

| | Additive | | |
|---|---|---|---|
| | Test A: 5% polyethylene, 2% diglycidyl ether | Test B: 5% polyethylene, 2% diglycidyl ether | Test C: 5% polyethylene, 1% diglycidyl ether |
| Heat treatment (230° C.) | No. | Yes | Yes |
| Yield point (kg./cm.²) | 570 | 660 | 650 |
| Impact resistance (kg. cm./cm.²) | 170 | 150 | >200 |
| Martens temp. (° C.) | 59.5 | 64 | 62 |
| Specific weight | 1.315 | 1.327 | 1.319 |

As will be apparent from these comparisons, a substantial improvement in the properties of the injection molded products occurs when the regranulated molding composition has been heat-treated as compared to the direct employment of the granulate without the heat-treatment. Surprisingly, as little as 1% diglycidyl ether exhibits considerably better impact resistance while other properties are improved almost as much as with 2% diglycidyl ether.

It is believed that the after-treatment of the regranulated homogeneous mixture by heating it to temperatures below its melting point but sufficiently high to reduce the melt index results in an accelerated and extensive reaction between the diglycidyl ether and the polyethylene terephthalate. Such a reaction tends to be confirmed by the fact that smaller amounts of the diglycidyl ether accompanied by the heat-treatment yields about the same results as obtained with much larger amounts of diglycidyl ether but omitting the heat-treatment. Of course, some reaction may take place during the regranulation and injection molding under conventional temperature conditions where the polymer mixture is essentially in the molten form, but it was quite surprising that a still further improvement in properties could be accomplished simply by heating the solid regranulate for extended periods of time. It is assumed that a chain lengthening of the molecules occurs during this heat-treatment with a partial formation of side chains and/or cross-linking, particularly since an increase in viscosity can be observed and even controlled during the heat treatment.

In connection with this presumed enlargement or cross-linking of polymer molecules, there appears to be a formation of a favorable crystalline structure so that the injection molded articles produced from the molding compositions of the invention are distinguished by very good surface properties. In general, the degree of crystallinity of the modified polyester can be determined by density measurements as well as other conventional means. Whether the regranulate is heat-treated or not, the injection molded articles exhibit a relatively high degree of crystallization. Even under rapid injection conditions, values of 20–25% have been attained. This results in a surface hardness which is highly suited to the requirements of many injection molded articles.

Depending upon the amount of the diglycidyl ether added to the polyester and the extent to which the regranulated product is heat-treated according to the invention, it is possible to reduce injection molding temperatures by as much as 30° C. below those temperatures normally required for injection molding the pure polyester. This permits an economy of energy in the injection molding machine and, in addition, substantially diminishes the decomposition of the polyester which always occurs to some extent since it is known that the polyester tends to decompose when in its molten form.

The compositions and methods of the invention have a special advantage which resides in the fact that the final injection molded articles need not be tempered or cured in order to achieve a satisfactory dimensional stability. This stability is inherent in the molded product itself as imparted by the composition and the methods employed herein. All of the injection molded articles obtained according to the present invention are thus highly distinguished by a very minimal shrinkage, e.g. of less than 1%. The molded articles remain substantially true to size even at high temperatures of 140° C. or more.

It is feasible to melt blend, homogenize and directly inject the polymer mixtures of the invention in a single, continuous operation provided that one uses injection molding apparatus equipped with suitably large mixing and homogenizing zones and provided that temperatures and pressures are carefully controlled. However, uniform results and high quality products can best be achieved if the polymer mixture is regranulated and then preferably heat-treated at the prescribed temperatures for controlled periods of time. The resulting granulate thus represents a highly uniform product with predictable injection molding properties and can be easily processed in conventional injection molding machines without any serious difficulties.

In particular, the heat-treatment of the regranulate permits one to vary the molding properties of the composition within wide limits and thereby one can also vary the molding conditions within a much wider range with good control of the results than is possible with a granulate or molding material which has not been after-treated at elevated temperatures. Of course, excessively large amounts of the diglycidyl ether and/or extensively high temperatures for long periods of after-treatment should be avoided in order to prevent too high a viscosity of the injection molding material.

In general, one skilled in this art can readily work with the compositions of the invention for producing injection molded articles. For example, these compositions and especially the heat-treated granulates can be subjected to longer residence periods in the cylinder of the injection molding machine, e.g. as may occur during interruptions of a production run, without observing any detrimental effect on the injection process or on the molded articles. Furthermore, the injection molding processing can be achieved within relatively wider temperature ranges as compared to the non-modified polyester. The injection molding process itself is therefore distinguished by its ease of operation, insensibility to disturbing influences and a high degree of dependability and quality control. For example, a blockage of the extrusion screw or similar undesirable effects of conventional polyester molten compositions do not occur when injection molding is accomplished according to the present invention.

Also, the invention provides a much greater latitude in the production of injection molded articles for a wide variety of end uses, including high temperature applications and the production of articles with precise dimensions. The design of molds and the functioning of injection molding equipment is greatly simplified by the adaptability of the compositions and molding materials of the invention to a variety of injection molding conditions.

The invention is hereby claimed as follows:

1. An injection molding composition comprising granular polyethylene terephthalate having a relative viscosity of about 1.45 to 2.2, measured as a 1% solution of the polymer in meta-cresol at 25° C., in which there is melt blended and homogeneously distributed about 0.3 to 30% by weight of at least one diglycidyl ether of the formula

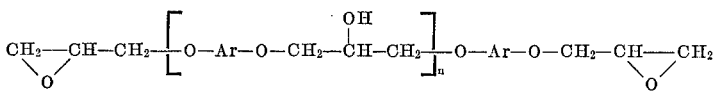

wherein Ar is a divalent radical representing the residue of an epoxidized dihydric phenol and $n$ represents an integer of from 0 up to about 30, said composition exhibiting a melt index value of at least 0.05 up to about 5 grams/minute.

2. A composition as claimed in claim 1 wherein said polyethylene terephthalate contains about 0.5 to 10% by weight of said diglycidyl ether.

3. A composition as claimed in claim 2 wherein the diglycidyl ether is selected from the class consisting of

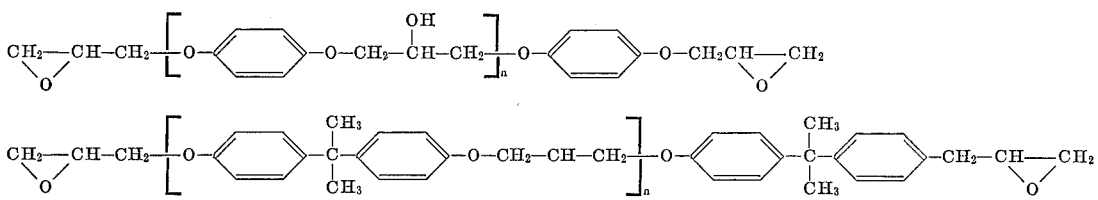

and mixtures thereof wherein $n$ is an integer of approximately 10 to 15.

4. A composition as claimed in claim 2 wherein the polyethylene terephthalate component has a relative viscosity of about 1.7 to 2.1.

5. A composition as claimed in claim 2 wherein there is additionally melt blended and homogeneously distributed in said polyethylene terephthalate about 0.5 to 20% by weight of a polyolefin selected from the class consisting of polypropylene, poly-4-methylpentene-1 and mixtures thereof.

6. A composition as claimed in claim 2 wherein there is additionally melt blended and homogeneously distributed in said polyethylene terephthalate about 0.5 to 20% by weight of a high pressure polyethylene having a density of approximately 0.915 to 0.930.

7. A process for the modification of polyethylene terephthalate for injection molding which comprises homogeneously admixing, melt blending and regranulating said polyethylene terephthalate with about 0.3 to 30% by weight of at least one diglycidyl ether of the formula

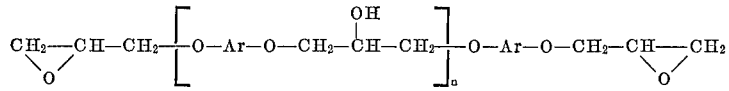

wherein Ar is a divalent radical representing the residue of an epoxidized dihydric phenol and $n$ represents an integer of from 0 up to about 30, and then injection molding the regranulated material into an article of predetermined configuration.

8. A process as claimed in claim 7 wherein said polyethylene terephthalate is admixed with about 0.5 to 10% by weight of said diglycidyl ether.

9. The injection molded article obtained by the process of claim 8.

10. The injection molded article obtained by the process of claim 7.

11. A process as claimed in claim 7 wherein the regranulated homogeneous mixture of said polyethylene terephthalate and said diglycidyl ether is heated at about 150° C. to 250° C. for about 1 to 30 hours prior to said injection molding.

12. A process as claimed in claim 11 wherein the regranulated mixture is heated at about 180° C. to 230° C. for a period of approximately 5 to 20 hours prior to said injection molding.

13. A process as claimed in claim 11 wherein the regranulated mixture is heated for a period of time sufficient to provide a melt index value of about 0.9 to 1.2 g./min.

14. The injection molded article obtained by the process of claim 12.

15. A composition as claimed in claim 1 exhibiting a melt index value of about 0.9 to 1.2 grams/minute.

16. A process for producing a modified polyethylene terephthalate injection molded article which comprises homogeneously admixing and melt blending polyethylene terephthalate with about 0.3 to 30% by weight of at least one diglycidyl ether of the formula

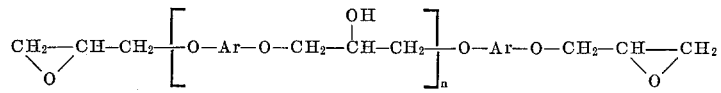

wherein Ar is a divalent radical representing the residue of an epoxidized dihydric phenol and $n$ represents an integer of from 0 up to about 30, and then injection molding the resulting melt blended material into an article of predetermined configuration.

17. The injection molded article obtained by the process of claim 16.

18. A process for the modification of polyethylene terephthalate for injection molding which comprises homogeneously admixing and melt blending a polyethylene terephthalate having a relative viscosity of about 1.45 to 2.2, measured as a 1% solution of the polymer in meta-cresol at 25° C., with about 0.3 to 30% by weight of at least one diglycidyl ether of the formula

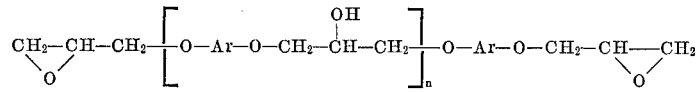

wherein Ar is a divalent radical representing the residue of an epoxidized dihydric phenol and $n$ represents an integer of from 0 up to about 30, regranulating the resulting melt blended material and then heating the regranulated material at about 150° C. to 250° C. for about 1 to 30 hours.

19. A process as claimed in claim 18 wherein the re-granulated material is heated at about 180° C. to 230° C. for a period of approximately 5 to 20 hours.

References Cited

UNITED STATES PATENTS

| | | | |
|---|---|---|---|
| 3,361,848 | 1/1968 | Siggel | 260—873 |
| 3,372,143 | 3/1968 | Terada | 260—75 |

FOREIGN PATENTS

| | | | |
|---|---|---|---|
| 872,254 | 7/1961 | Great Britain | 260—835 |
| 1,227,653 | 10/1966 | Germany | 260—835 |
| 652,507 | 1/1965 | Belgium. | |
| 605,400 | 9/1960 | Canada | 260—75 |

PAUL LIEBERMAN, Primary Examiner

U.S. Cl. X.R.

264—331; 260—47, 75, 835, 836, 837